UNITED STATES PATENT OFFICE.

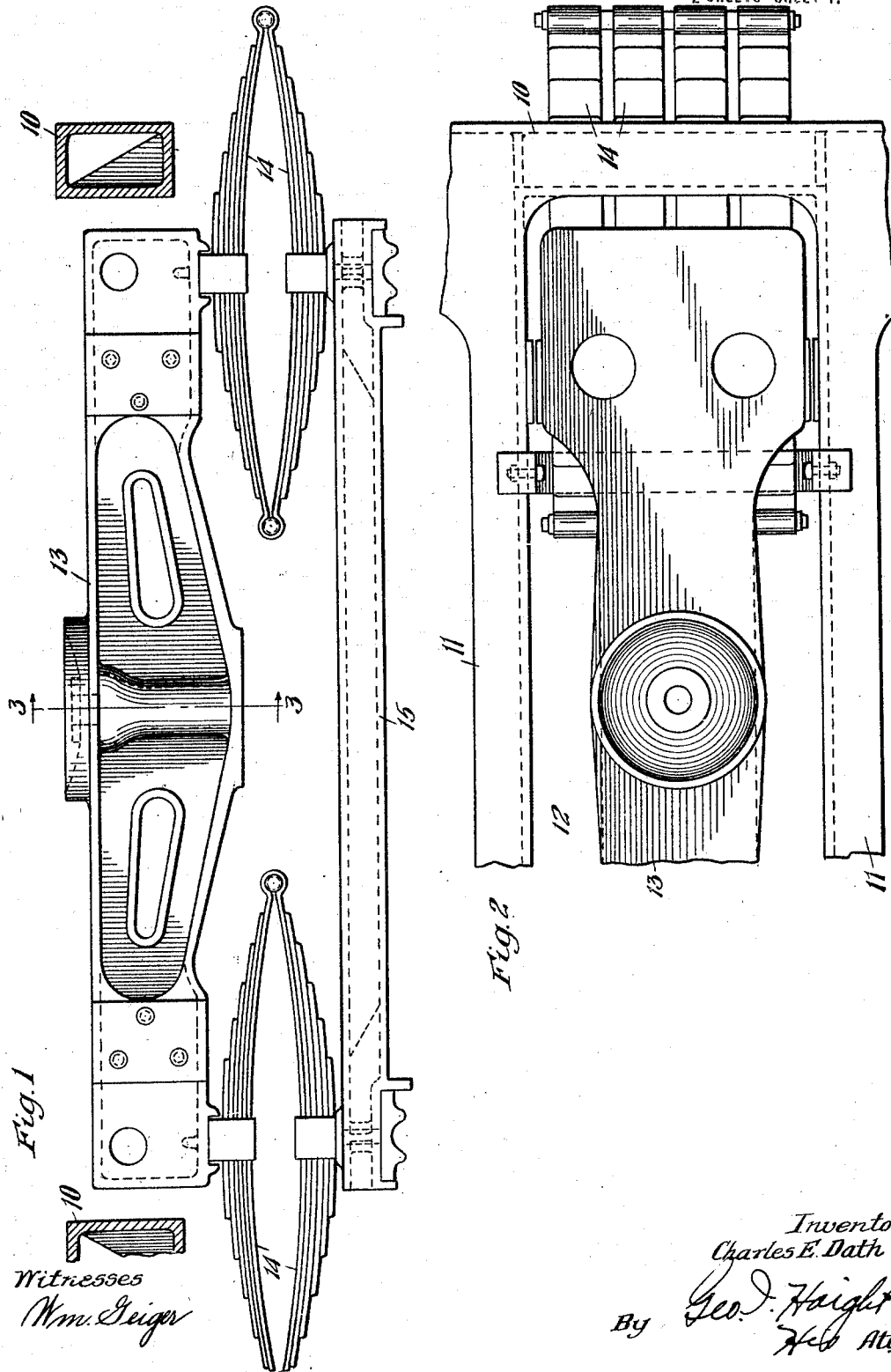

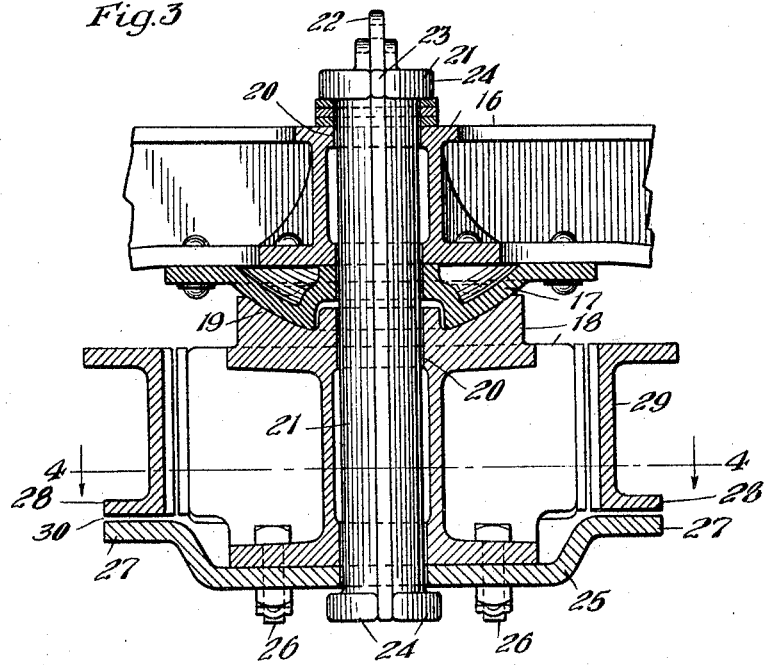
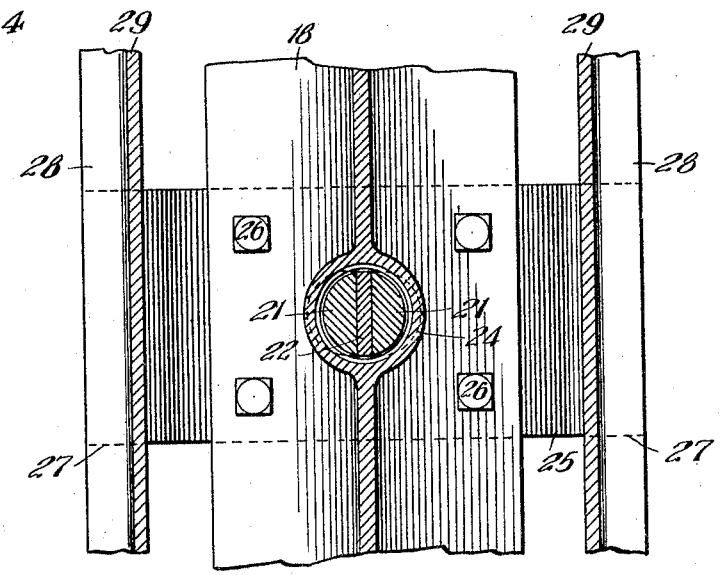

CHARLES E. DATH, OF CHICAGO, ILLINOIS, ASSIGNOR TO WILLIAM H. MINER, OF CHAZY, NEW YORK.

BOLSTER-LOCKING DEVICE.

1,402,842.   Specification of Letters Patent.   Patented Jan. 10, 1922.

Application filed September 18, 1920. Serial No. 411,318.

*To all whom it may concern:*

Be it known that I, CHARLES E. DATH, a citizen of the United States, residing at Chicago, in the county of Cook and State of Illinois, have invented a certain new and useful Improvement in Bolster-Locking Devices, of which the following is a full, clear, concise, and exact description, reference being had to the accompanying drawings, forming a part of this specification.

This invention relates to improvements in bolster locking devices.

In the operation of railway cars, it has heretofore been found desirable to provide means for locking the body and truck bolsters of cars together in such a way as to prevent vertical separation thereof and thus prevent or at least minimize danger from telescoping of the cars in the event of collisions. Heretofore, the use of such locking devices, from a practical standpoint, has been limited to certain types of trucks wherein the truck bolster is assembled with the truck frame in such a way that the truck bolster is prevented from vertical separation with respect to the truck frame. No adequate provision has been made for effectively interlocking the body and truck bolsters of those cars employing a truck in which the body bolster is not so interlocked with the truck frame that the truck bolster cannot be pulled out vertically from the truck frame. Trucks of the character last described occur in trucks of the type known as "four-wheel trucks" employed generally in passenger equipment.

The object of my invention is to provide a body and truck bolster locking arrangement especially designed for four-wheel trucks of that type wherein the truck bolster is ordinarily inserted and removed from the truck frame freely in a vertical direction and in which there is no inherent construction in the truck itself to prevent the truck bolster being lifted or pulled out vertically from the truck frame in the event of collisions.

In the drawings forming a part of this specification, Figure 1 is a part elevational view part vertical sectional view of a well known type of four-wheel truck showing more particularly the manner in which the truck bolster is assembled with the other parts of the truck. Figure 2 is a top plan view of a little more than half of the truck bolster and associated transoms of the construction illustrated in Figure 1. Figure 3 is a vertical sectional view corresponding substantially to the line 3—3 of Figure 1 showing my improvements applied to the type of truck illustrated in Figures 1 and 2. The plane of the section in Figure 3 extends parallel to the center line of the car. And Figure 4 is a detail horizontal sectional view corresponding substantially to the line 4—4 of Figure 3.

Referring first to the construction illustrated in Figures 1 and 2, 10—10 denote the side frames of the truck with which are cast integrally or rigidly united therewith, spaced transoms 11—11, leaving an elongated substantially rectangular opening 12 to accommodate the truck bolster 13. The truck bolster 13, as shown in Figures 1 and 2 and which is customary in many types of four-wheel trucks employed in passenger equipment, is inserted vertically within the opening 12 and is therefore free to move vertically with respect to the truck frame and without adequate provision to prevent said bolster from being pulled or lifted out of the truck frame in the event of collision. It is the general practice to support the ends of the truck bolster on heavy elliptic springs 14—14 which are mounted on a spring plank 15. It is not deemed necessary to describe other features of the truck.

In carrying out my invention, as shown in Figures 3 and 4, the body bolster 16 is provided on its under side with the usual center bearing plate 17 and the truck bolster 18 is formed with a preferably integral corresponding center bearing plate 19. As is customary, both bolsters and the center bearing plates are provided with vertically alined openings 20—20 to accommodate a king pin. In carrying out the present invention, I employ a detachable locking king pin which consists of two side members 21—21 and a central spreader 22. Each of the side members 21 is substantially semi-circular in cross section as shown in Figure 2 and the spreader 22 consists of a plate shouldered at the top as indicated at 23. Each of the side members 21 are also shouldered at both top and bottom as indicated at 24—24. The dimensions of the two side elements 21 are such that they may be inserted within the king pin openings before the spreader 22 is introduced and, after the spreader 22 is put in place, the shoulders 24—24 will overhang adjacent portions of the truck and body bolsters as indicated in Figure 3.

It is evident from the foregoing that the locking center pin above described will prevent vertical separation of the body and truck bolsters while at the same time permitting the usual turning or swiveling movement thereof. To make the invention effective, I employ a heavy wide plate 25 preferably detachably secured to the under side of the truck bolster 18 as by bolts 26—26. Said plate 25 has its ends upwardly offset and extended horizontally as indicated at 27—27 beneath the adjacent bottom flanges 28—28 of the two transoms 29—29. In normal position of the parts, the ends 27 of the plate 25 are spaced from the under sides of the transoms as indicated at 30 a distance sufficient to permit vertical vibration of the truck bolsters 18 with respect to the transoms and truck frame within usual limits. In the event however that an abnormal condition occurs as in the case of a collision when a tendency would arise to pull the truck bolster out from between the transoms, it is evident that this action will be prevented by the plate 25 and the locking pin obviously prevents vertical separation between the two bolsters and hence I obtain a practical bolster locking device effective between the car body bolster and the truck.

I have herein shown and described what I now consider the preferred manner of carrying out the invention but it will be evident that various changes and modifications may be made in the details of construction without departing from the spirit of the invention. The essential characteristics of the invention are the means for interlocking the body and truck bolsters and means for preventing abnormal vertical movement of the truck bolster with respect to the transoms.

I claim:

1. In car construction, the combination with a body bolster and a truck having transoms and a truck bolster vertically insertible between the transoms; of detachable means located at the centers of the body and truck bolsters, arranged to lock the same against vertical separation while at the same time permitting relative turning movements; and cooperating means, rigid with the truck bolster and transoms respectively, adapted to prevent the truck bolster being moved vertically relatively to the transoms more than a predetermined amount, the means on the transoms being above and normally slightly vertically spaced from the means on the truck bolster, said cooperating means being distinct from said detachable means.

2. In car construction, the combination with a body bolster and a truck having transoms and a truck bolster vertically insertible between the transoms; of detachable means located at the centers of the body and truck bolsters, arranged to lock the same against vertical separation while at the same time permitting relative turning movements; and a member rigidly secured to the truck bolster and having portions thereof extending under portions of the transoms and normally slightly vertically spaced therefrom.

3. In car construction, the combination with a body bolster and a truck having transoms and a truck bolster vertically insertible between the transoms; of detachable means located at the centers of the body and truck bolsters, arranged to lock the same against vertical separation while at the same time permitting relative turning movements; and a plate rigidly but detachably secured to the under side of the truck bolster, said plate having its ends extended under adjacent portions of the transoms.

In witness that I claim the foregoing I have hereunto subscribed my name this 10th day of Sept., 1920.

CHARLES E. DATH.

Witness:
CARRIE GAILING.